UNITED STATES PATENT OFFICE 2,431,190

DIAZOTYPE PRINTS WITH HYDROXY PYRIDONE COUPLERS

Jack F. Morgan, Phillipsburg, N. J., assignor to General Aniline & Film Corporation, New York, N. Y., a corporation of Delaware No Drawing. Application June 12, 1946,
Serial No. 676,357

6 Claims. (Cl. 95—6)

The present invention relates to diazotype prints, to the light-sensitive materials utilized in the production thereof, and more particularly to the azo or coupling components capable of yielding prints of a purple shade.

It is known that the diazotype process involves treating a base such as paper and the like with a sensitizing composition containing a light-sensitive diazo compound, exposing the treated base through a pattern and subjecting the exposed material to development by means of an alkali in the presence of a coupling component capable of reacting with the undestroyed diazo compound to yield an azo dyestuff image. In one modification of the process, the sensitizing composition for the base contains only the diazo component, the azo coupling component being applied separately at the time of development. However, in the more usual process, generally referred to as the two-component diazotype process, the sensitizing composition for the base contains both the diazo component and the azo coupling component, azo dye formation taking place after exposure by subjecting the exposed sensitized material to the action of an alkali, preferably ammonia vapors.

The diazotype art has rather rigid requirements with respect to the characteristics of the azo component. In the first instance, it must yield with the diazo component pleasing prints usually of a sepia or bluish tone. It must be amenable to rapid coupling with the diazo component in the presence of an alkali. In the two-component compositions, it must have the ability to resist precoupling until the proper stage of the process, to wit, the point at which the alkali is applied. It is also generally required that the coupling component have sufficient solubility in water to permit the application of the sensitizing composition from an aqueous solution.

It has been found in practice that there are not very many coupling components which meet the prerequisites of the diazotype art. Generally the art has fallen back on the utilization as coupling components of aromatic polyhydric compounds such as the phenols typified by resorcinol for the production of sepia prints, and naphthols typified by 2,3-dihydroxynaphthalene for the production of blue-type prints (see U. S. P. 2,196,950). While both of these types of couplers meet many of the requirements, both suffer from the disadvantage that they have a marked tendency to precouple on storage.

As stated, the couplers for the most part are aromatic in nature. There has been some suggestion to use the pyrazolones but this proposal has been given little attention. Other than this, it is rare indeed to find any suggestion that heterocyclic type couplers be utilized for the production of diazotype prints.

I have now found a new class of couplers heterocyclic in nature which may be generally referred to as hydroxy pyridones, which have the necessary properties and at the same time are more stable against precoupling than resorcinol when used in the two-component system. Such couplers react with the usual diazo compounds, particularly those of the paraphenylenediamine class to give prints of pleasing purpose shade having very good visual intensity.

It is accordingly an object of the present invention to produce diazotype prints of a purple shade while utilizing a nitrogenous heterocyclic compound as the coupling component.

It is a further object of this invention to produce diazotype prints while utilizing as the coupling component a hydroxy pyridone.

A further object of the present invention are sensitizing compositions for diazotype work in which the coupling component is a hydroxy pyridone substituted in the 6-position.

A further object of the present invention is the method for producing attractive purple diazotype prints of a high visual intensity by exposing a light-sensitive diazotype material containing as the coupling component a 6-substituted hydroxy pyridone and developing the exposed material with an alkali.

Other and further important objects of the invention will become apparent as the description proceeds.

The pyridones which are utilized as coupling components according to the present invention are typified by the following structural formula:

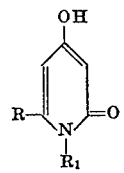

in which R is aryl such as phenyl and the like, or alkyl such as methyl, ethyl, propyl, butyl, isobutyl and the like, and $R_1$ is hydrogen, aliphatic, i. e., alkyl such as methyl, ethyl, propyl, butyl, amyl and the like, hydroxyalkyl such as hydroxymethyl, hydroxyethyl and the like, aminoalkyl such as aminoethyl and the like, dialkylaminoalkyl, such as diethylaminoethyl and the like, alicyclic, such as cyclohexyl and the like, aromatic, e. g., aralkyl such as benzyl.

Examples of compounds illustrative of this general class and which I have found to be suitable for my purpose are the following:

(1) 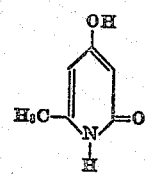
4-hydroxy-6-methyl-2(1) pyridone (2) 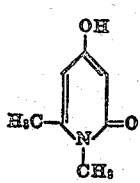
1,6-dimethyl-4-hydroxy-2(1) pyridone (3) 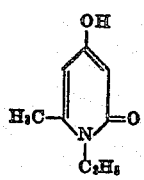
6-methyl-4-hydroxy 1-ethyl-2-(1) pyridone (4) 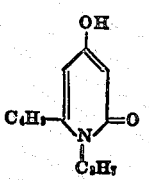
6-butyl-4-hydroxy-1-propyl-2(1) pyridone (5) 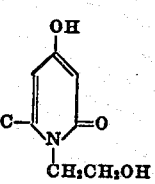
6-methyl-4-hydroxy-1-(beta-hydroxy)-ethyl-2(1) pyridone (6) 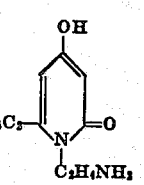
6-ethyl-4-hydroxy-1-aminoethyl-2(1) pyridone (7) 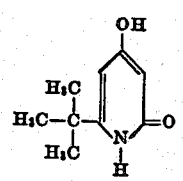
6-isobutyl-4-hydroxy-2(1) pyridone (8) 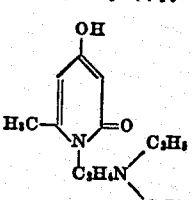
6-methyl-4-hydroxy-1-diethylaminoethyl-2(1) pyridone (9) 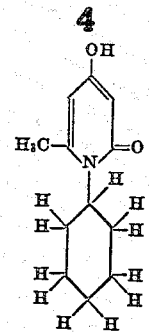
6-methyl-4-hydroxy-1-cyclohexyl-2(1) pyridone

(10) 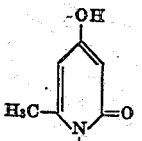
6-methyl-4-hydroxy-1-dimethylaminoethyl-2(1) pyridone

(11) 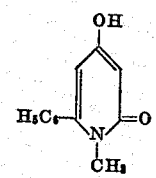
6-phenyl-4-hydroxy-1-methyl-2(1) pyridone

(12) 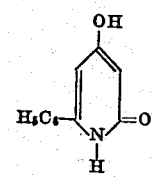
6-phenyl-4-hydroxy-2(1) pyridone

(13) 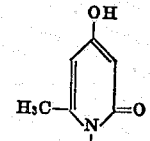
6-methyl-4-hydroxy-1 benzyl-2(1) pyridone

While the coupling components are believed to exist primarily in the form depicted above, i. e., as the 4-hydroxy-2(1) pyridones, the N-substituted derivatives may exist in the tautomeric diketo form, e. g.,

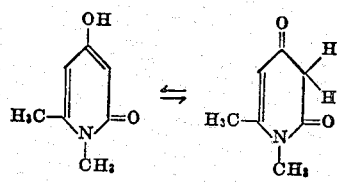

Similarly, 4-hydroxy-2(1) pyridones which contain no substituent on the nitrogen may exist not only in the tautomeric diketo but also in the tautomeric dihydroxy form, e. g.,

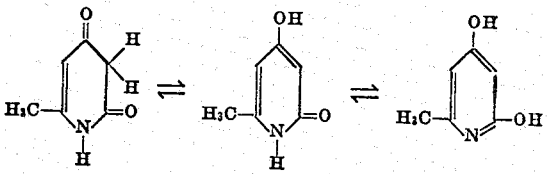

The compounds contemplated by the first formula above may be prepared by subjecting a pyronone to the action of concentrated sulfuric acid at elevated temperatures of the order of about 115° to 150° C. and treating the resulting product with ammonia or an amine. The reaction by which such compounds may be prepared is graphically illustrated as follows:

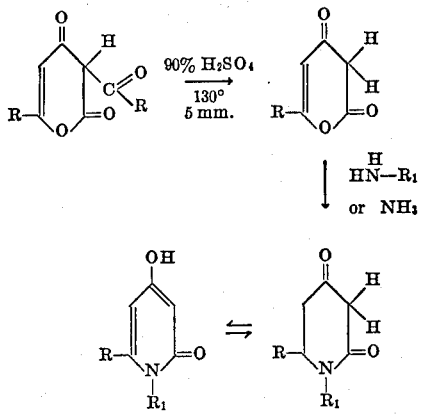

in which R and $R_1$ have the same values as those given above. Pyridones of the aforementioned classification wherein R is methyl and $R_1$ is methyl, cyclohexyl, p-dimethylaminophenyl and their method of preparation are disclosed on page 2379 of Berichte 69, volume II (1936). Similarly, pyridones in which R is phenyl and $R_1$ is hydrogen and their method of preparation are disclosed on page 2380 of the same volume of Berichte.

The pyridone in which R is ethyl and $R_1$ is hydrogen, to wit, 6-ethyl-pyridine-diol-2.4 may be prepared by mixing dehydrapropionyl acetic acid with concentrated sulfuric acid, i.e., 90% strength and heating the mixture on an oil bath to a temperature of 130° C. while stirring. After about 5 minutes, the reaction is complete, whereupon the solution is cooled to about 30° C. and chilled by pouring it on ice. The 6-ethyl-pyronone which precipitates is filtered and washed with water.

The 6-ethyl pyronone is then converted into the desired pyridone by heating it with ammonia as described in pages 2379-2380 of the aforementioned volume of Berichte.

The dehydrapropionyl acetic acid used as the parent material in the above reaction has the following formula:

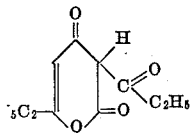

It is prepared from dehydrapropionyl acetocarboxylic acid of the formula:

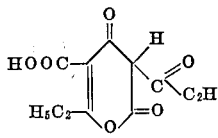

by heating a potassium hydroxide solution of said aceto-carboxylic acid, having a pH of between 6 and 8, to a temperature of 90° C. for a few hours. The dehydrapropionyl acetic acid thus formed is precipitated by addition of acetic acid, filtered and washed with water.

The dehydrapropionylacetocarboxylic acid in turn is obtained by reacting propionic anhydride in excess of theory with acetone dicarboxylic acid while maintaining a temperature of from about 0° to 10° C. The resulting solution is then vacuum distilled to eliminate propionic acid. The residue in the still is cooled, then chilled with ice, whereupon an immediate separation of solid takes place. The solid which is dehydrapropionylacetocarboxylic acid is then filtered and washed with water.

If it be desired to produce pyridones in which the 6-position is substituted by propyl, butyl, or isobutyl, the above reactions are followed excepting that one uses butyric anhydride, valeryl chloride and isovaleryl chloride respectively in lieu of propionic anhydride in the above reaction.

As is evident from the disclosure in Berichte, the desired values for $R_1$ may be obtained by heating the 6-substituted pyronones with the desired amine, such as an alkylamine, an alkylene diamine, an alkylolamine, an aromatic amine, or the like. To illustrate, if it be desired to prepare a pyridone substituted in the 6-position by ethyl, and in the 1-position by hydroxyethyl, 6-ethyl pyronone would be heated with ethanolamine.

Although some of the 4-hydroxy-2(1) pyridones are not sufficiently water-soluble to permit their utilization in an aqueous solution, they may be readily rendered water-soluble by conversion to the salt of an acid such as the hydrochloride, hydrosulfate and the like, just as, for instance, aniline is converted into its hydrochloride. Alternatively, the free pyridone may be employed by dissolving in an organic solvent and precoating the base with the solution obtained as illustrated in Example II.

The diazo component which is utilized with the aforesaid coupling components may be any of those generally employed in the diazotype art, preferably those of the class of p-phenylene diamines. The diazos may be utilized as such or in the form of their stabilized double salts such as with zinc chloride, cadmium chloride, tin chloride or the like, as the fluoroborates or as the alkyl or aryl sulfonates such as the methyl, ethyl, propyl, phenyl and the like sulfonates or as the sulfates. Examples of diazos which I have found to be suitable are:

2.5.4'-triethoxydiphenyl-4-diazonium acid sulfate
The diazos from p-(N-hydroxyethyl-N-methylamino)-aniline
p-(N-hydroxyethyl-N-ethylamino)-aniline
p-Amino-diphenylamine
p-Amino-N-ethyl-o-toluidine
4-diethylamino-o-phenetidine
4-benzoylamine-2.5-diethoxyaniline
p-Diethylaminoaniline
p-Dimethylaminoaniline
p-(N-benzyl-N-ethyl)-aniline
p-Di-(hydroxyethyl)-amino-aniline
p-(N-hydroxyethyl-N-methylamino)-aniline
p-Ethylamino-m-toluidine
p-(N-ethyl-N-hydroxyethylamino)-o-toluidine
4-diethylamino-2-ethoxyaniline
p-Di-(hydroxyethyl)-amino-o-chloro-aniline
p-Ethylaminoaniline
p-Phenylenediamine The sensitizing compositions may contain in addition to the diazo compound and the azo component the usual adjuncts such as metal salts for intensification of the dyestuff image such as aluminum sulfate, titanium ammonium fluoride, nickel sulfate, zinc chloride and the like, stabilizing agents such as thiourea, thiosinamine, naphthalene trisulfonic acid and the like, acids for retarding precoupling such as citric acid, boric acid, tartaric acid, or mixtures thereof and the like, hydroscopic agents such as ethylene glycol, glycerine, dextrin and the like, solvents such as isopropyl alcohol and the like, and wetting agents such as saponin and the like.

The reaction between the diazo compound and the pyridone by which the dyestuff images are formed appears to take place at the carbon atom between the keto groups. Consequently the dyestuff of which the images are constituted may be said to have the following formula:

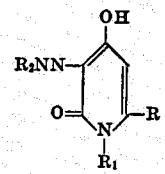

wherein $R_2$ is the radical of a primary arylamine and R and $R_1$ have the values given above.

The base to which the sensitizing compositions are applied may be made from any of the usual film-forming materials and may be in the form of a sheet, film or web. Suitable film-forming materials are paper, regenerated cellulose, cellulose ethers such as cellulose ethyl ether, cellulose esters such as cellulose acetate, cellulose propionate, cellulose acetate-propionate, cellulose butyrate and the like, linear superpolymers such as the superpolyamides, superpolyesters, superpolyethers, superpolyureas, superpolyurethanes and the like.

While it is preferred that the azo component be incorporated in the sensitizing compositions in accordance with the two-component diazotype work, nevertheless the invention may be effected while applying the coupling component to the exposed material along with the alkaline developer. It is accordingly understood that the invention is to be interpreted as having this construction.

The invention is further illustrated by the accompanying examples, but it is to be understood that the invention is not restricted thereto as the examples are exemplary rather than limitative.

*Example I*

100% rag paper was coated with an aqueous solution containing the following ingredients per 100 cc. of solution:

6-methyl-4-hydroxy-2(1) pyridone__grams__ 2.2
The zinc chloride double salt of 4-(N-methyl-N-β-hydroxyethylamino)-benzene diazonium chloride _____grams__ 4.6
Concentrated hydrochloric acid _____cc__ 2
Isopropanol _____cc__ 2
Ethylene glycol_____cc__ 5
Citric acid_____grams__ 4
Boric acid_____do____ 4
Zinc chloride_____do____ 5
Thiourea _____do____ 5
Saponin _____do____ 0.5

The resulting sensitized paper after exposure to a pattern and development in the usual developing machines with gaseous ammonia yields prints of an excellent purple shade having a high line density. If the sensitized paper be stored for 6 hours at 50° C. under 81% relative humidity (forced-ageing), the prints obtained upon exposure and development show less visual background than corresponding prints made while utilizing the same sensitizing composition but with resorcinol as the coupler.

*Example II*

1.7 grams of 6-ethyl-4-hydroxy-1-methyl-2(1) pyridone are dissolved in 35 cc. of hot dimethyl formamide and the resulting solution was utilized to coat 100% rag paper. To this precoated paper was applied the other components of Example I excepting the coupling component thereof. Upon exposure and development with ammonia, prints were obtained having a very good line density of a deep purple color.

*Example III*

The procedure is the same as in Example I excepting that there is used in lieu of the 6-methyl-4-hydroxy-2(1) pyridone, 6-isobutyl-4-hydroxy-2(1) pyridone.

*Example IV*

The procedure is the same as in Example I excepting that there is used in lieu of the 6-methyl-4-hydroxy-2(1) pyridone, 6-methyl-4-hydroxy-1-(β-hydroxy)-ethyl-2(1) pyridone.

I claim:
1. Light-sensitive diazotype material comprising a base carrying a light-sensitive diazo compound and as the coupling component a pyridone selected from the class consisting of those of the following constitution:

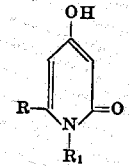

wherein R is selected from the class consisting of alkyl and aryl and $R_1$ is selected from the class consisting of hydrogen, aliphatic, alicyclic and aromatic radicals and the water-soluble salts of such compounds.

2. The light-sensitive material defined in claim 1 wherein the light-sensitive diazo compound is derived from a p-phenylenediamine.

3. Light-sensitive diazotype material comprising a base carrying a light-sensitive diazo compound and as the coupling component 6-methyl-4-hydroxy-2(1)-pyridone.

4. Light-sensitive diazotype material comprising a base carrying a light-sensitive diazo compound and as the azo component 6-ethyl-4-hydroxy-1-methyl-2(1) pyridone.

5. The light-sensitive material defined in claim 4 wherein the light-sensitive diazo compound is the zinc chloride double salt of 4-(N-methyl-N-β-hydroxymethylamino)-benzene diazonium chloride.

6. The light-sensitive diazotype material defined in claim 5 wherein the light-sensitive diazo compound is 4-(N-methyl-N-β-hydroxyethylamino)-benzene diazonium chloride.

JACK F. MORGAN.

REFERENCES CITED

The following references are of record in the file of this patent:

UNITED STATES PATENTS

| Number | Name | Date |
|---|---|---|
| 2,298,444 | Weissberger | Oct. 13, 1942 |

FOREIGN PATENTS

| Number | Country | Date |
|---|---|---|
| 606,039 | Germany | Nov. 23, 1934 |